(12) United States Patent
Flynn (10) Patent No.: US 6,474,082 B2
(45) Date of Patent: Nov. 5, 2002

(54) VERY LOW TEMPERATURE FLOW SWITCH APPARATUS

(76) Inventor: Kevin Flynn, 15 Mosswood Ct., Novato, CA (US) 94947

( * ) Notice: Subject to any disclaimer, the term of this patent is extended or adjusted under 35 U.S.C. 154(b) by 0 days.

(21) Appl. No.: 09/886,936

(22) Filed: Jun. 21, 2001

(65) Prior Publication Data

US 2002/0011073 A1 Jan. 31, 2002

Related U.S. Application Data

(60) Provisional application No. 60/214,560, filed on Jun. 27, 2000.

(51) Int. Cl.[7] .......................... F25B 41/00; G01K 13/00
(52) U.S. Cl. ........................ 62/129; 62/196.1
(58) Field of Search .................. 62/129, 126, 125, 62/196.1; 340/626, 603, 606, 611

(56) References Cited

U.S. PATENT DOCUMENTS

| | | | |
|---|---|---|---|
| 3,768,273 A | | 10/1973 | Missimer |
| 4,506,521 A | * | 3/1985 | Asano et al. ............... 62/238.7 |
| 4,535,597 A | | 8/1985 | Missimer et al. |
| 4,535,598 A | * | 8/1985 | Mount .......................... 62/126 |
| 4,597,267 A | | 7/1986 | Forrest |
| 4,926,658 A | * | 5/1990 | Olsen et al. ................ 62/324.1 |
| 5,441,658 A | | 8/1995 | Boyarsky et al. |
| 5,730,216 A | * | 3/1998 | Viegas et al. ................ 165/233 |
| 2002/0017106 A1 | * | 2/2002 | Flynn et al. .................. 62/156 |

* cited by examiner

*Primary Examiner*—Denise L. Esquivel
*Assistant Examiner*—Marc Norman (57) ABSTRACT

Flow in a forward direction through a check valve is detected by a signaling device in parallel with the check valve and sensing the pressure differential across the check valve. The signaling device outputs an electrical signal that indicates whether or not the pressure differential across the valve is sufficient to open the valve to flow. A flow restrictor such as a capillary tube is in parallel with the check valve to by-pass a small portion of flow during normal operation and to equalize pressure across the check valve inlet and outlet when the check valve is otherwise closed to flow.

10 Claims, 5 Drawing Sheets

VERY LOW TEMPERATURE FLOW SWITCH APPARATUS

This application claims the benefit of earlier filed and currently pending provisional application No. 60/214,560 filed Jun. 27, 2000.

FIELD OF THE INVENTION

This invention is directed at a method of sensing flow and providing a switch to indicate the presence of flow of a fluid that is at very low temperature (−40 C to −273 C). More particularly this invention is intended to sense the flow of a refrigerant at these very low temperatures.

BACKGROUND OF THE INVENTION

Refrigeration systems have been in existence since the early 1900s, when reliable sealed refrigeration systems were developed. Since that time, improvements in refrigeration technology have proven their utility in both residential and industrial applications. In particular, very low-temperature refrigeration systems currently provide essential industrial functions in biomedical applications, cryoelectronics, physical vapor deposition vacuum coating processes, and semiconductor manufacturing applications.

This invention relates to refrigeration systems which provide refrigeration (removal of heat) at temperatures between −40 C and −273 C. The temperatures encompassed in this range are variously referred to as low, ultra low and cryogenic. For purposes of this Patent the term "very low" or very low temperature will be used to mean the temperature range of −40 C to −273 C.

As a customer security measure, closed loop, very low temperature refrigeration systems must provide a refrigerant flow indicator in highly sensitive applications. In general, these systems require that all components withstand operating pressures between 1 and 31 atmospheres, and maintain a leak tight integrity.

Traditional means of sensing refrigerant flow requires moving elements, such as turbine meters, or other means of displacement of the sensing element. In refrigeration systems, small amounts of compressor oil may be present in the refrigerant that may congeal at low temperatures and interfere with the moving parts of these sensors. Flow sensors or flow switches that meet the leak integrity and working pressure requirements are usually very costly and are susceptible to contamination from this congealed oil. Other means of sensing flow, measure the pressure drop across an element such as an orifice or venturi section and then measure the pressure difference between the two points across or within such an element. These methods require knowledge of the flow properties of the fluid as a function of temperature, pressure and flow rate which can be difficult for applications in which the range of flow conditions vary substantially. The present invention provides a means to sense the presence of flow reliably and without a detailed knowledge of the fluid being sensed.

Many industrial applications require the ability to transfer heat in an efficient manner at a relatively fast rate. In applications where the presence of flow of a cooling media are considered essential to the process, a means of flow indication is required. Examples of such critical applications are storage of biological tissue, or the processing of a silicon wafer as part of a semiconductor manufacturing process. Providing a means of sensing flow or lack of flow alerts the user to the fact that flow is no longer present. In some control applications, where for example a heater is used to control temperature, such a flow indicating device can be used as an interlock to assure that heat is applied only when flow is occurring.

Conventional flow switching devices with displacing elements cannot detect flow of fluids at very low temperature temperatures (−40° C. to −273 C.) due to the incompatibility of sensing elements. Such very low temperatures require that the sensing element be suited for operation at very low temperatures. Specifically the materials used must not lose a significant portion of their mechanical strength and must not deform or become brittle. For closed loop refrigeration processes leak tight operation is also mandated. This means that the very low temperature flow switch must also be leak tight. In addition to mechanical strength issues, typical flow switches available have elastomeric seals that leak to the atmosphere at very low temperatures. In addition, the materials used must be chemically compatible with the fluid being sensed. Failure to have proper chemical compatibility results in degradation of sealing material, or moving parts and eventually result in component failure. Flow switches designed to meet all of these various requirements are typically very expensive. The present invention describes a means to provide sensing of a very low temperature fluid while satisfying the requirements for mechanical strength, leak tightness and chemical compatibility. This is achieved using components that are much less expensive than typical flow switches designed to meet these requirements.

There are many vacuum processes which have the need for such very low temperature cooling. The chief use is to provide water vapor cryopumping for vacuum systems. The very low temperature surface captures and holds water vapor molecules at a much higher rate than they are released. The net effect is to quickly and significantly lower the chamber's water vapor partial pressure. Another application involves thermal radiation shielding. In this application large panels are cooled to very low temperatures. These cooled panels intercept radiant heat from vacuum chamber surfaces and heaters. This can reduce the heat load on surfaces that are being cooled to lower temperatures than the panels. Yet another application is the removal of heat from objects being manufactured. In some cases the object is an aluminum disc for a computer hard drive, a silicon wafer for an integrated circuit, or the material for a flat panel display. In these cases the very low temperature provides a means for removing heat from these objects more rapidly than other means, even though the object's final temperature at the end of the process step may be higher than room temperature. Further, some applications involving, hard disc drive media, silicon wafers, or flat panel display material, involve the deposition of material onto these objects. In such cases heat is released from the object as a result of the deposition and this heat must be removed while maintaining the object within prescribed temperatures. Cooling a surface like a platen is the typical means of removing heat from such objects. In all these cases it is to be understood that the evaporator surface is where the refrigerant is removing heat from these customer applications when providing cooling at very low temperatures.

Refrigeration systems can also be used to provide a heating function for industrial processes in addition to providing refrigeration. This is needed when the system must provide a defrost or bakeout function. A defrost function delivers warm refrigerant to the object that is typically being cooled. The purpose is to bring the object to a temperature close to room temperature. This is typical of vacuum processes in which the vacuum chamber must be opened to room air. Having the evaporator surface at room temperature eliminates condensation of room air moisture in the vacuum chamber. A bakeout function also delivers warm refrigerant to the evaporator surface that is typically being cooled. Unlike the defrost function the purpose of the bakeout is to warm the evaporator surface above room temperature, typically +60 C to +110 C for an extended period of time, typically 1 to 24 hours. This can be useful when desorbing water vapor from the vacuum chamber after the chamber has been exposed to moist ambient air. During defrost and bakeout processes it is important to verify that refrigerant is flowing. Therefore for the flow switch to be fully effective its design must provide operation at elevated temperatures in addition to very low temperature. The present invention describes a means to satisfy these requirements.

BACKGROUND PATENTS

U.S. Pat. No. 5,730,216, "Air conditioning and refrigeration units utilizing a cryogen," assigned to Thermo King Corporation (Minneapolis, Minn.), describes an air conditioning and refrigeration apparatus for controlling the temperature of a conditioned space to a predetermined temperature band adjacent to a predetermined set point temperature via cooling and heating cycles utilizing a supply of pressurized cryogen. A cryogen driven motor drives a fan and an alternator. The alternator provides control voltage for operating electrical control devices which select a heating cycle, or a cooling cycle, as required, and which control the flow of cryogen during the selected cycle. Electrical load on the alternator, and thus a load on the vapor driven motor, is minimized to maintain air delivered by the fan to the conditioned space at a level that provides a substantially uniform air flow and temperature throughout the conditioned space. A cryogen flow control valve is motor controlled and only requires electrical energy when a change in the cryogen flow rate is desired. Heating and cooling cycle selecting valves require no electrical energy during a cooling cycle, and very little electrical energy during a heating cycle, as cryogen pressure is utilized to shift the heating and cooling cycle selecting valves when a heating cycle is desired.

U.S. Pat. No. 4,535,598, "Method and control system for verifying sensor operation in a refrigeration system," assigned to Carrier Corporation (Syracuse, N.Y.), describes a method and control system for checking and verifying sensor operation in a refrigeration system. A microcomputer control system determines whether a signal provided by the sensor is within normal limits prior to startup of the refrigeration system. Also, the microcomputer system verifies an out of bounds sensor signal provided to the microcomputer system from the sensor during operation of the refrigeration system by intermittently monitoring the sensor to determine whether a pre-selected consecutive number of out of bounds signals are provided to the microcomputer control system from the sensor. If the microcomputer control system determines that the signal provided by the sensor is not within normal limits prior to startup of the refrigeration system, or if the microcomputer system verifies an out of bounds signal provided by the sensor during operation of the refrigeration system, then the microcomputer control system generates an alarm signal to abort the startup or shut down the operation of the refrigeration system, respectively.

One difference between the present invention and the background patents is that the present invention is a combination of conventional elements arranged to detect very low temperature fluid flow in a refrigeration system, whereas the background patents are not.

The present invention utilizes standard industrial components to provide a means of sensing flow of a very low temperature fluid and providing a switch output. This is done while assuring chemical compatibility of the flow switch with the fluid, providing a leak tight design, providing proper design pressures, and providing suitable materials for use at temperatures ranging from a few hundred degrees C to −273 C.

SUMMARY OF THE INVENTION

The present invention provides a very low temperature flow switch apparatus for use in a refrigeration system or industrial process. The very low temperature flow switch of the present invention provides a way to detect flow of very low temperature fluid in a refrigeration system or industrial process. The very low temperature flow switch is for use in any type of refrigeration system or process, such as a single-refrigerant system, a mixed-refrigerant system, normal refrigeration processes, cascade refrigeration processes, an auto-refrigerating cascade cycle, a Klimenko cycle, or a single expansion device system. It can also be used for any industrial process that uses very low temperature fluids.

In accordance with the invention, flow in forward direction through a check valve is detected by a signaling device in parallel with the check valve and sensing the pressure differential across the check valve. When the forward differential pressure exceeds the cracking pressure of the valve, the valve opens for a refrigerant flow and substantially concurrently the signaling device outputs an electrical signal to indicate that the valve is open to forward refrigerant flow. A flow restrictor, e.g., a capillary tube, in parallel with the check valve equalizes the refrigerant pressure at the inlet and outlet of the check valve when the differential pressure across the valve drops below the valve cracking pressure and the check valve closes to flow. Whenever the differential pressure is less than cracking pressure, the signaling device changes its electrical output to indicate that the valve is closed to flow. The signaling device may be pressure switches or pressures transducers connected to the valve inlet and outlet respectively or a single pressure differential device in parallel with the control valve.

Sensing the flow of refrigerant and outputting a switch signal provides process verification for the industrial process of interest. In some cases temperature control is achieved by applying heat to refrigerant with a heater. Having a switch that confirms that refrigerant is flowing provides a means to interlock the heater. That is, power to the heater can be interrupted by this switch if fluid flow is not occurring. This is useful to prevent excessive temperatures from occurring when fluid flow is unexpectedly stopped. In applications where continuous flow and temperature stability are important the flow switch provides an early warning that flow has been interrupted.

As an example, biological tissues are typically stored at very low temperatures and are cooled by a very low temperature fluid such as liquid nitrogen or by a refrigerant or a mixture of refrigerants. Having electrical indication that flow has been lost provides a faster indication than waiting for the temperature to begin rising, which can damage the biological tissues being stored. Likewise, any other application needing very low temperature cooling can benefit from verification that flow is occurring.

Still other objects and advantages of the invention will be apparent in the specification.

The invention accordingly comprises the features of construction, combinations of elements, and arrangements of parts, which will be exemplified in the constructions hereinafter set forth, and the scope of the invention will be indicated in the claims.

BRIEF DESCRIPTION OF THE DRAWINGS

For better understanding of the invention, reference is had to the following description taken in connection with the accompanying drawings, in which.

DESCRIPTION OF PREFERRED EMBODIMENTS

Figure 1:
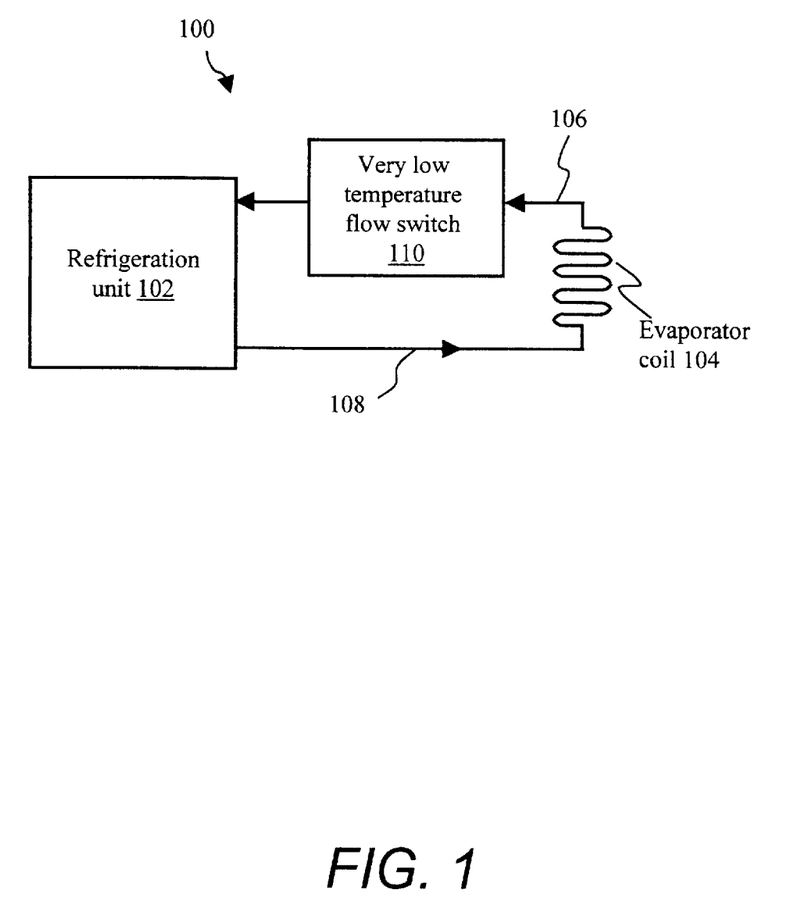
FIG. 1 is a schematic of a very low temperature refrigeration system having a very low temperature flow switch in accordance with the invention.

FIG. 1 is a block diagram of a refrigeration system to use the very low temperature flow switch in accordance with the invention. FIG. 1 shows a conventional refrigeration system 100 and includes a refrigeration unit 102 feeding a first end of an evaporator coil 104 via a feed line 108. The loop is closed from a second end of evaporator coil 104 back to refrigeration unit 102 via a return line 106. Additionally, a very low temperature flow switch 110 is inserted in return line 106.

Refrigeration system 100 is a conventional refrigeration system and its basic operation, which is the removal and relocation of heat, is well known in the art. Likewise, the following elements of refrigeration system 100 are well known in the industry: refrigeration unit 102, evaporator coil 104, feed line 108, and return line 106. All components are connected for refrigeration flow.

Refrigeration unit 102 is any refrigeration system or process, such as a single-refrigerant system, a mixed-refrigerant system, normal refrigeration processes, an individual stage of a cascade refrigeration processes, an autorefrigerating cascade cycle, or a Klimenko cycle.

More specifically, refrigeration unit 102 may be the Polycold (San Rafael, Calif.) system (i.e., autorefrigerating cascade process), APD Cryogenics (Allentown, PA) system with single expansion device (i.e., single stage cryocooler having no phase separation, Longsworth U.S. Pat. No. 5,441,658), Missimer type cycle (i.e., autorefrigerating cascade, Missimer U.S. Pat. No. 3,768,273), Kleemenko type (i.e., two phase separator system), or a single phase separator system. Also refrigeration unit 102 may be variations on these processes such as described in Forrest U.S. Pat. No. 4,597,267 and Missimer U.S. Pat. No. 4,535,597.

Several additional basic variations of refrigeration unit 102 shown in FIG. 1 are possible. Refrigeration unit 102 may be one stage of a cascaded system, wherein the initial condensation of refrigerant may be provided by low temperature refrigerant from another stage of refrigeration. Similarly, the refrigerant produced by the refrigeration unit 102 may be used to cool and liquefy refrigerant of a lower temperature cascade process. Further, the refrigeration unit shown in FIG. 1 uses at least a single compressor. It is recognized that the refrigerant vapor compression effect can be obtained using two or more compressors in parallel, or that the compression process may be broken up into stages via compressors in series or a two stage or multi stage compressor. All of these possible variations are considered to be within the scope of this disclosure.

Further, FIG. 1 associates with only one evaporator coil 104. In principle this approach can be applied to multiple evaporator coils 104 cooled by a single refrigeration process 102. In such a construction, each independently controlled evaporator coil 104 requires a separate flow switch to sense flow of refrigerants.

In the preferred embodiment, flow switch 110 is connected in line with the return line 106 and refrigeration unit 102. Therefore, refrigerant returning from the evaporator via return line 106 passes through the flow switch and is then delivered to refrigeration unit 102. Locating the flow switch on the return line assures that it is sensing flow returning to the refrigeration unit. If the flow switch was located on the feed line 108 it could not sense a condition in which refrigerant was leaking to the atmosphere from the evaporator 104, or the return line 106, and not returning to the refrigeration unit 102.

Alternative uses of the very low temperature flow switch are to sense a recirculating liquid or gas. For example, some industrial processes use a liquid pump or a gas compressor in combination with a refrigerant unit (not shown) to provide a source of very low temperature liquid or gas which is pumped to a heat transfer surface for the purpose of removing heat from a process. In these arrangements the liquid pump, or gas compressor, plus refrigeration unit take the place of the refrigeration unit 102 of FIG. 1. All other elements shown in FIG. 1 are needed to complete the flow path and sense flow.

Still other variations include very low temperature gasses or liquids mixtures of liquids or gasses that are used in an open flow loop arrangement (not shown). That is, the very low temperature fluid that is not recirculated but is discharged to the environment or to some receiver vessel. In such an open flow loop, a source of very low temperature fluid, such as liquid nitrogen is supplied to a heat transfer surface for the purpose of removing heat. In this case the flow switch can be located at the outlet of the heat transfer surface.

Very low temperature flow switch 110 is a combination of conventional elements used to detect the flow of very low temperature fluid through refrigeration system 100. Very low temperature flow switch 110 is described in further detail in FIG. 2 through FIG. 5 below.

Figure 2:
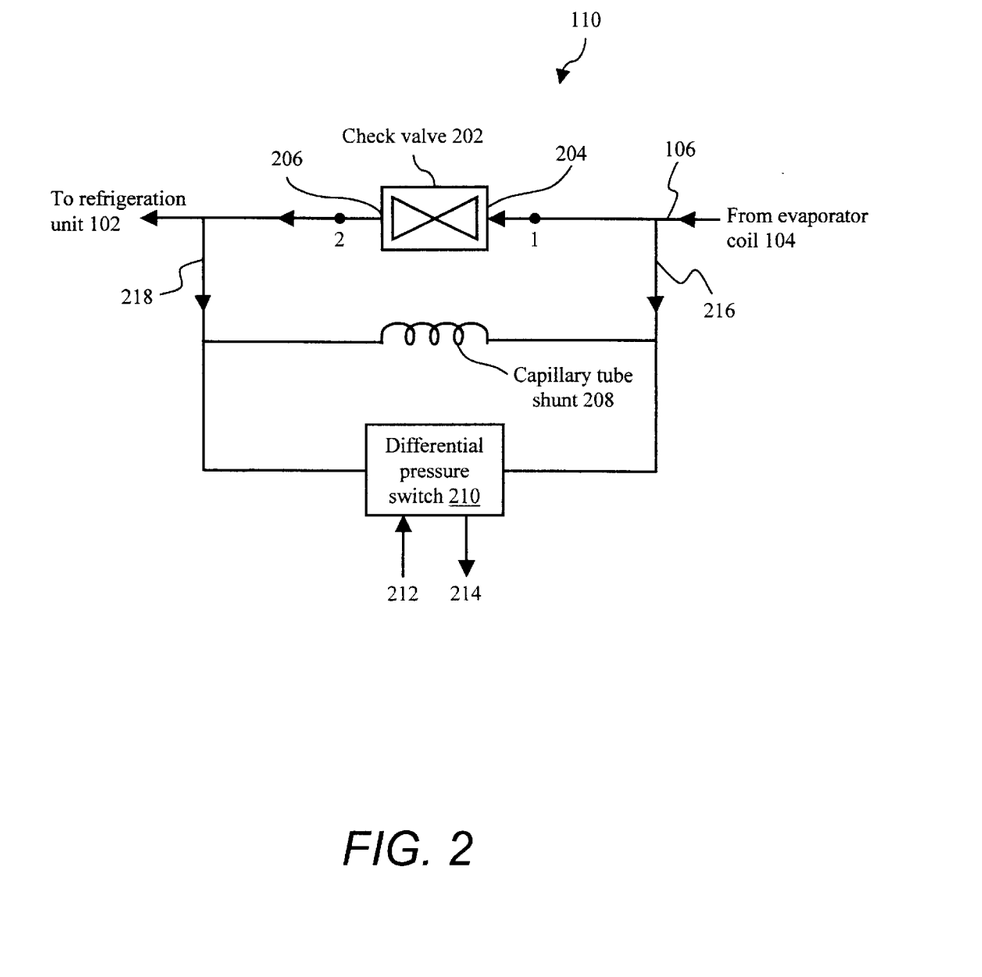
FIG. 2 is a schematic of an embodiment of the very low temperature flow switch of FIG. 1.

FIG. 2 shows a first embodiment via a block diagram of very low temperature flow switch 110, in accordance with the invention, which includes a check valve 202 having a first end 204 and a second end 206, a capillary tube shunt (shunt tube) 208, a differential pressure switch (DPS) 210 having a signal input 212 and a signal output 214, a first pressure tube 216, and a second pressure tube 218. All components are connected for refrigerant flow except for signals 212 and 214, which are electrical connections.

Check valve 202, capillary tube shunt 208, and DPS 210 are arranged in parallel and are connected between first pressure tube 216 and second pressure tube 218.

Check valve 202 is a conventional check valve, such as a Checkall valve (West Des Moines, Iowa), made of materials such as stainless steel, or any other material exhibiting similar properties to stainless steel at very low temperatures, and suitable for use at elevated temperatures. Check valve 202 includes an internal movable spring (not shown) to allow flow through check valve 202 from first end 204 to second end 206 (forward direction), when the pressure at first end 204 is high enough, relative to the pressure at second end 206 to overcome the force exerted on the internal valve components by the spring. When the pressure differential is in the reverse direction from second end 206 to first end 204, flow is blocked by check valve 202 regardless of the differential's magnitude. In the present invention, internal spring pressure is factory set to a required minimum differential (or cracking) pressure between first end 204 and second end 206 before opening check valve 202. Alternatively, check valve 202 may include adjustable internal springs. The first end 204 of the check valve 202 is connected to return line 106 from the evaporator coil 104 (FIG. 1) and the second end 206 of the check valve 202 is connected to the return connection of the refrigeration unit 102.

Differential pressure switch (DPS) 210 is a conventional differential pressure switch such as an Ashcroft (Milford, Conn.) or Danfoss (Nordborg, Denmark) pressure switch, and can be located in a remote location. DPS 210 further includes an internal movable diaphragm (not shown) that responds to the pressure differential across the check valve 202 via pressure tubes 216 and 218, respectively. The set point of very low temperature flow switch 110 is determined by the cracking pressure of check valve 202. The reset pressure of DPS 210 must be sufficiently small such that very low temperature flow switch 110 resets when there is no pressure difference across check valve 202.

DPS 210 provides switch contacts which change state when the switch set point is reached. When pressure set point is reached the switch changes from its normal state (i.e switch contacts open) and activates a switch (i.e. switch contacts closed). When the reset pressure is reached the switch will go back to its normal state. Signal input 212 and signal output 214 are used to detect the change in switch state. When flow is determined to be on, DPS 210 produces signal output 214 as a digital high; when flow is determined to be off, signal output 214 is a digital low. Those skilled in the art recognize that either digital convention can be used.

In cases where flow has stopped, the differential pressure required to keep check valve 202 open is no longer present. This causes check valve 202 to close, and provides a tight seal. However, when it closes a differential pressure, close to the valves' cracking pressure will exist across check valve 202. It is necessary to relieve this pressure. This is accomplished by means of a small orifice, or restrictive tubing that provides a path for equalization but does not permit significant bypass around check valve 202 during normal operation.

In an embodiment of the present invention, shunt tube 208 is a small capillary tube made of a material such as copper that is used to divert a portion of very low temperature fluid around check valve 202 to equalize pressure across check valve 202. Shunt tube 208 typically allows a small percentage (typically 0.1 to 15%) of the normal flow of very low temperature fluid from return line 106, to allow the pressure across check valve 202 to drop below the cracking pressure when check valve 202 changes from the flow condition to the no flow condition. Shunt tube 208 is shown as an example of a pressure relief device. However, any such device that allows fluid to bleed off through a pressure-reducing orifice may be used. Such a pressure reducing function can also be incorporated in the valve construction.

As an example, a refrigeration unit manufactured by IGC-Polycold, model number PFC-551 HC, which provides a cooling capacity of 1000 W with an average evaporator temperature of −115 C, makes use of flow switch 110 of the present invention. In this example, the elements of flow switch 110 of this IGC-Polycold refrigeration unit are as follows: check valve 202 is a CheckAll valve, model number UNSW-050-SS-M-5.0, which has a cracking pressure of 5 psi differential, shunt tube 208 is a capillary tube having an internal diameter of 0.036 inches and a length of 18 inches, and DPS 210 is an Ashcroft model D420B-15#, which can detect differentials as low as 3 psi.

In operation, very low temperature fluid circulates from refrigeration unit 102 through feed line 108 to evaporator coil 104. Very low temperature fluid exits evaporator coil 104 through return line 106, where it enters the very low temperature flow switch 110 (FIG. 1).

Thus, a difference in pressure is established in the forward direction between first end 204 and second end 206 of check valve 202. For example, a fluid pressure of 30 psi (pounds per square inch) is produced at first end 204 of check valve 202, and a fluid pressure of 20 psi is produced at second end 206 of check valve 202 by refrigeration unit 102. A differential of 10 psi is detected by DPS 210. If, in the present example, 5 psi is the minimum cracking pressure (or minimum pressure difference required to open the check valve 202), then check valve 202 opens, allowing fluid flow from evaporator coil 104 through check valve 202.

As the difference of pressure across the check valve 202 increases to the preset cracking pressure, an internal diaphragm within DPS 210 moves to a point to energize an internal switching mechanism for transmission of signal output 214. This signal that corresponds with the opening of the valve 202, can be used to alert system monitoring devices or other diagnostics equipment to indicate a flow condition.

As very low temperature fluid flow decreases, the differential pressure in the forward direction decreases to a level where the internal diaphragm in DPS 210 moves, thereby disconnecting the internal switching mechanism and producing a digital low at signal out 214. Those skilled in the art recognize that either digital convention can be used.

The cracking pressure of check valve 202 should be minimized in those applications where high pressure drop can reduce efficiency. This is true for refrigeration systems where having a significant pressure drop on the return line from evaporator coil 104 results in warmer evaporator temperatures. Refrigeration systems can eliminate this effect by locating flow switch 110 in line with the feed line to evaporator coil 104.

Additionally, the selection of check valve 202 and DPS 210 must be matched to assure that the range of each device is compatible. For example, the cracking pressure of check valve 202 needs to be high enough to actuate DPS 210. DPS 210 must be able to reset to the normal condition when no flow is present and the pressure difference is close to zero. Differential pressure switches with very low differential set points, less than 3 psi are not readily available at low cost for some industrial applications. For this reason embodiments two, three and four address alternative means of sensing pressure, which are not by availability of low cost pressure sensors capable of detecting differential pressures less than 3 psi.

It should be understood that the block diagrams of FIGS. 1 through 5 are functional representations showing interconnections, but not necessarily illustrating relative physical positioning of components.

One advantage of this arrangement (FIG. 2) of components is that DPS 210 is thermally isolated from the very low temperature fluid by the extended length of first pressure tube 216 and second pressure tube 218. Having thermal isolation allows the pressure switch to sense room temperature static fluid and allows standard, non-exotic pressure switches to be used. This significantly reduces the cost of the required pressure switch. To accomplish thermal isolation the arrangement of first pressure tube 216 and second pressure tube 218 (hereafter referred to as the pressure tubes) prevents very low temperature fluid that is flowing through check valve 202 or capillary shunt tube 208 from dripping down the pressure tubes to the connection of DPS 210. This is accomplished by having DPS 210 located vertically higher than capillary shunt tube 208, and check valve 202.

Alternatively DPS 210 is located vertically lower than the check valve 202 and shunt tube 208 and the arrangement of the pressure tubes is such that a vertical upward riser and vertical downward drop is provided to interrupt the potential flow of very low temperature refrigerant. In addition the diameter of the pressure tubes may be limited to eliminate the possibility of very low temperature fluid from contacting DPS 210. In this case however, the pressure tubes diameters must be large enough between the check valve 202 and the shunt tube 208 to permit adequate flow to the shunt tube. The pressure tubes connecting the DPS 210 can be of smaller diameter since no continuous flow is occurring, only pressure is being transmitted. Additionally the length of tubing, its material and thickness and the thermal environment around the pressure tubes determine the temperature at the connection to DPS 210. In some cases for example, copper tubing may be too conductive and stainless steel will provide enough thermal resistance to keep DPS 210 near room temperature. In other cases a practical means of keeping DPS 210 at room temperature is to put the pressure tube in thermal contact with an object near room temperature such as a water line or the refrigerant line exiting a water cooled condenser.

Since very low temperature fluid is flowing through check valve 202 and shunt tube 208 it is important that the flow contain no particles or other material that would compromise the reliable operation of either component. Typically strainers are used to mechanically filter such contaminants. In some cases small amounts of oil or other freezable material may be present which could accumulate in check valve 202. For this reason it is recommended that check valve 202 be installed at an angle between about 75 and 15 degrees relative to the vertical with the flow outlet end lower than the first end. This provides a means for any accumulated matter to drain out, particularly for liquids that might form and remain at the end of a defrost or bakeout process.

Figure 3:
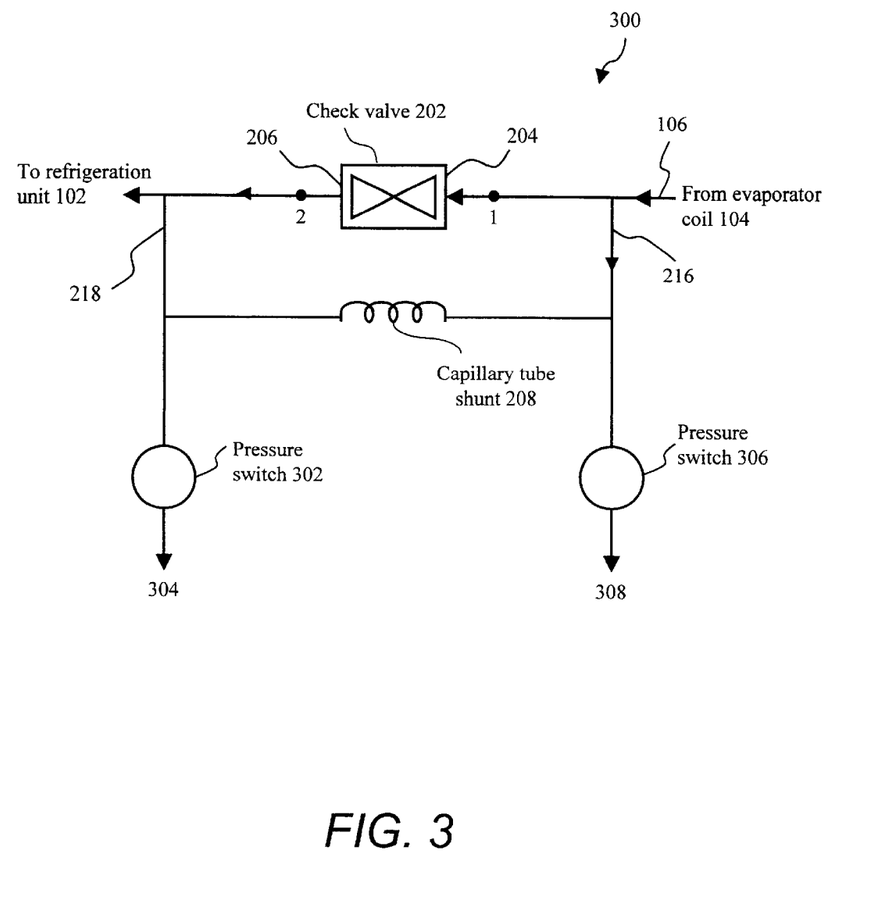
FIG. 3 is a schematic of an alternative embodiment of a very low temperature flow switch in accordance with the invention.

In a second embodiment FIG. 3 is a block diagram of a very low temperature flow switch 300 in accordance with the invention. Very low temperature flow switch 300 is an alternative embodiment of very low temperature flow switch 110 shown in FIG. 2, and includes a first pressure switch (PS1) 302 having a PS1 signal out 304, and a second pressure switch (PS2) 306 having a PS2 signal out 308. Flow switch 300 also includes check valve 202, shunt tube 208, first pressure tube 216, and second pressure tube 218, as shown in FIG. 2. Check valve 202 and shunt tube 208 are identical in form and function to those shown in FIG. 2.

In the present embodiment, PS1 302 and PS2 306 are identical in form and function with the exception that PS1 302 produces PS1 signal out 304 and PS2 306 produces PS2 signal out 308.

In operation, very low temperature fluid circulates from refrigeration unit 102 through feed line 108 to evaporator coil 104. Very low temperature fluid exits evaporator coil 104 through return line 106 where it enters very low temperature flow switch 300.

Fluid line pressure at first end 204 of check valve 202 is transmitted via first pressure tube 216 to PS2 306 and fluid line pressure at second end 206 of check valve 202 is transmitted via second pressure tube 218 to PS1 302. PS1 302 and PS2 306 are set to predetermined pressure points to initiate PS1 signal out 304 or PS2 signal out 308, respectively. In the present embodiment, PS1 302 and PS2 306 are shown as a combination of elements. However, if the pressure at the output of second end 206 of check valve 202 is a known value, PS1 302 is not required. Similarly, if the pressure input to check valve 202 is. a known value, PS2 306 is not required. The PS1 signal out 304 or PS2 signal out 308 can be used to alert system monitoring devices or other diagnostics equipment to indicate a normal operation or a flow condition.

In general, this arrangement is beneficial when one of the pressures, either at first end 204 or second end 206 of check valve 202 is fixed. As very low temperature fluid flow decreases, the pressures detected at PS1 302 and PS2 306 decrease to a predetermined reset point to disable PS1 signal out 304 and PS2 signal out 308.

Figure 4:
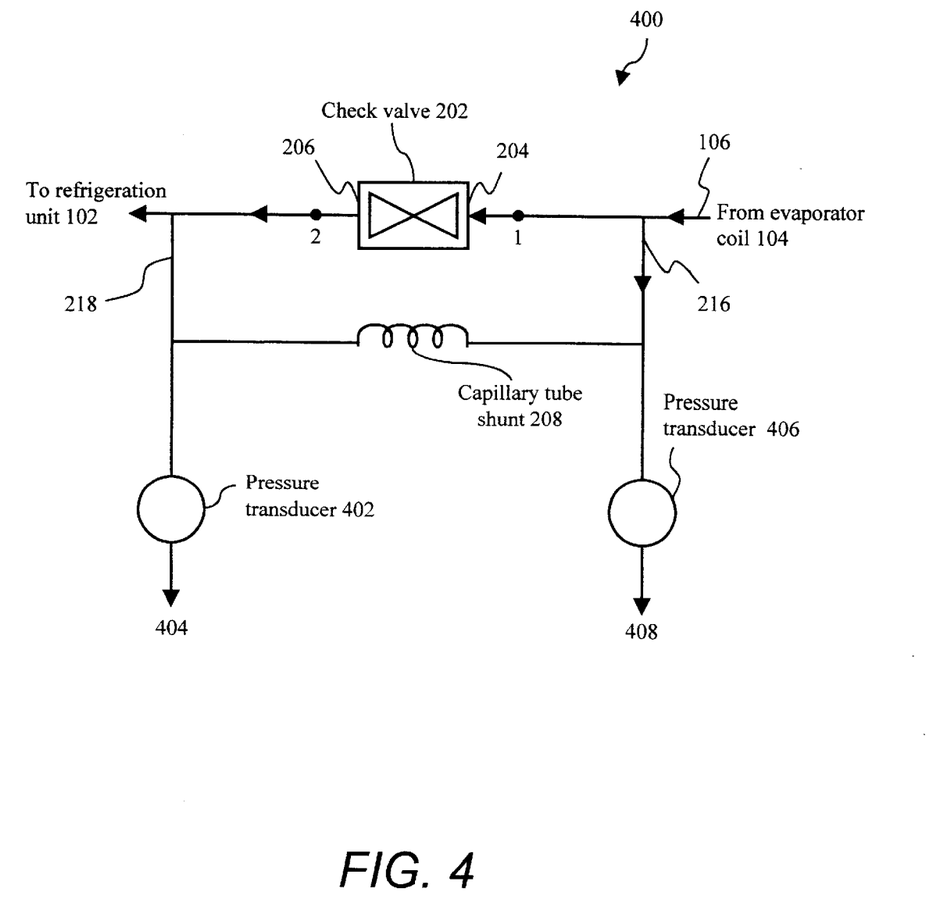
FIG. 4 is a schematic of another alternative embodiment of a very low temperature flow switch in accordance with the invention.

In a third embodiment, FIG. 4 shows a block diagram of a very low temperature flow switch 400 in accordance with the invention. Very low temperature flow switch 400 is an alternative embodiment of very low temperature flow switch 110 shown in FIG. 2, and includes a first pressure transducer (PT1) 402 having a PT1 signal out 404, and a second pressure transducer (PT2) 406 having a PT2 signal out 408. Flow switch 400 also includes check valve 202, shunt tube 208, first pressure tube 216, and second pressure tube 218, as shown in FIG. 2. Check valve 202 and shunt tube 208 are identical in form and function to those shown in FIG. 2.

In the present embodiment, PT1 402 and PT2 406 are identical in form and function, with the exception that PT1 402 produces PT1 signal out 404 and PT2 406 produces PT2 signal out 408.

In operation, very low temperature fluid circulates from refrigeration unit 102 through feed line 108 to evaporator coil 104. Very low temperature fluid exits evaporator coil 104 through return line 106 where it enters very low temperature flow switch 400.

Fluid line pressure at inlet end 204 of check valve 202 is transmitted via first pressure tube 216 to PT2 406, and fluid line pressure at outlet end 206 of check valve 202 is transmitted via second pressure tube 218 to PT1 402. PT1 402 and PT2 406 are set to predetermined set points to initiate digital signal output via PT1 signal out 404 or PT2 signal out 408, respectively. These signals are transmitted to a remote monitoring or diagnostic device that performs a conversion algorithm to determine fluid flow. PT1 signal out 404 or PT2 signal out 408 are used to alert system monitoring devices or other diagnostics equipment to indicate a normal operation or a flow condition. In such an arrangement the analog signal output by the transducers can be used by an electronic limit switch (not shown). In this case the electronic limit switch is set to an analog signal level that corresponds to the pressure of interest. In this case the combination of pressure transducer plus electronic limit switch produce the same function as the pressure switches, PS1 302 and PS2 302 of FIG. 3.

Alternatively, the outputs of the pressure transducers could be converted to a digital signal by an analog to digital converter (not shown). The digital signal could then be used by an electronic logic system than can compare the two pressure signals, determine if a flow condition exists and take appropriate action.

As very low temperature fluid flow decreases, the pressures detected at PT1 402 and PT2 406 decrease signal levels 404 and 408, which are detected by the associated analog or digital circuitry to determine when a flow condition no longer exists.

Figure 5:
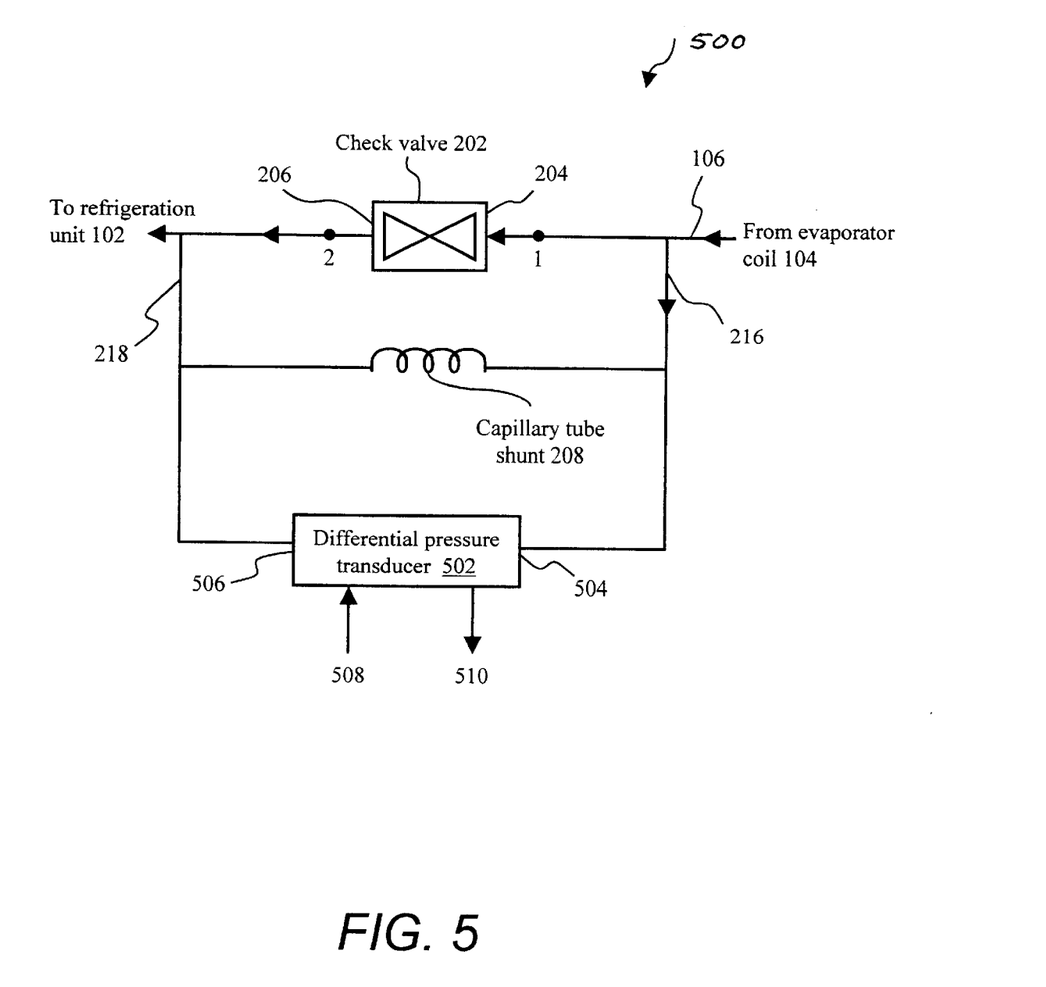
FIG. 5 is a schematic of yet another alternative embodiment of a very low temperature flow switch in accordance with the invention.

In a fourth embodiment FIG. 5 shows a block diagram of a very low temperature flow switch 500. Very low temperature flow switch 500 is an alternative embodiment of very low temperature flow switch 110 shown in FIG. 2, and includes a differential pressure transducer (DPT) 502 having a signal in 508 and a signal out 510. Flow switch 500 also includes check valve 202, shunt tube 208, first pressure tube 216, and second pressure tube 218, as shown in FIG. 2. Check valve 202 and shunt tube 208 are identical in form and function to those shown in FIG. 2.

DPT 502 is a conventional transducer (such as one from Barksdale, Los Angeles, Calif.) and has a DPT first end 504 that is connected to inlet end 204 of check valve 202, and a DPT second end 506 that is connected to outlet end 206 of check valve 202.

Fluid line pressure at inlet end 204 of check valve 202 is transmitted via first pressure tube 216 to DPT first end 504 of DPT 502. Fluid line pressure at outlet end 206 of check valve 202 is transmitted via second pressure tube 218 to DPT second end 506 of DPT 502.

As very low temperature fluid flow increases through check valve 202, fluid flow pressures from inlet end 204 and outlet end 206 of check valve 202 are transmitted to DPT 502. As pressure increases or decreases, DPT 502 transmits electronic signal out 510. Signal out 510 is transmitted to analog or digital circuitry as described in the third embodiment. In this case however, only a single signal needs to be processed which represents the differential pressure across check valve 202.

In summary, the invention provides a means to detect the flow of a very low temperature fluid and to produce an electronic signal which changes state between a flow condition and a no-flow condition. The invention permits the use of non-exotic components arranged to provide the flow indication function with high reliability. Specifically, none of the components are exposed to a temperature or pressure which adversely affects their reliable function or the safe use of the components.

What is claimed is:

1. A flow switch apparatus indicating whether or not fluid is flowing in said apparatus, comprising:

a check valve having an inlet and an outlet, fluid pressure at said inlet being greater than pressure of said fluid at said outlet in a first mode when said valve is open to fluid flow, said valve being closed to flow in a second mode when said outlet pressure is one of equal to and greater than said inlet pressure;

a signaling device for detecting whether said valve is in said first or second mode and outputting a corresponding electrical signal;

a throttle device in parallel with said check valve by connection across said valve inlet and outlet, said throttle device by-passing a portion of said fluid flow in said first mode, said throttle device permitting pressure equalization at said valve inlet and outlet when said valve switches from said first mode to said second mode.

2. A flow switch apparatus as in claim 1, wherein said portion that is by-passed is in a range of approximately 0.1% to 15% of said fluid flow.

3. A flow switch apparatus as in claim 2, wherein said throttle device is at least one capillary tube, throttle valve, venturi tube, porous plug, and a plate orifice.

4. A flow switch apparatus as in claim 1, wherein said signaling device includes at least one sensor to send said inlet and outlet pressures as inputs required to output said signal, said signal being electrical.

5. A flow switch apparatus as in claim 4, wherein said at least one sensor is one of a mechanical pressure switch, pressure sensitive transducer, differential pressure mechanical switch, and a differential pressure sensitive transducer.

6. A flow switch apparatus as in claim 5, wherein said signaling device connects to said valve inlet and said valve outlet with respective pressure tubes.

7. A flow switch apparatus as in claim 6, wherein said signaling device is maintained at a higher temperature than said fluid by location in a higher temperature ambient and by at least one of a length and material of said pressure tubes.

8. A flow switch apparatus as in claim 1, wherein said check valve is constructed to operate in said first mode only when said inlet pressures exceeds said outlet pressure by a predetermined value, the signal output from said signaling device changing when said check valve changes from said first mode to said second mode and vice versa.

9. A flow switch apparatus as in claim 1, wherein said fluid is a refrigerant at very low temperature, said check valve being in a return refrigerant flow line from an evaporator to a refrigeration unit in a closed refrigeration cycle.

10. A flow switch apparatus as in claim 9, wherein said refrigerant is a mixed refrigerant.

* * * * *